:::

United States Patent
Thai et al.

(10) Patent No.: US 8,634,399 B2
(45) Date of Patent: Jan. 21, 2014

(54) UPLINK AND BI-DIRECTIONAL TRAFFIC CLASSIFICATION FOR WIRELESS COMMUNICATION

(75) Inventors: Khac Thai, Wetsford, MA (US); John Y. Chao, Belmont, MA (US); Qiang Fu, Lexington, MA (US); Ravi Kumar, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1318 days.

(21) Appl. No.: 11/504,413

(22) Filed: Aug. 11, 2006

(65) Prior Publication Data

US 2007/0242627 A1 Oct. 18, 2007

Related U.S. Application Data

(60) Provisional application No. 60/792,001, filed on Apr. 12, 2006.

(51) Int. Cl.
*H04J 3/24* (2006.01)
*H04J 3/06* (2006.01)
*H04W 28/26* (2009.01)
*H04L 12/56* (2011.01)
*H04L 5/00* (2006.01)

(52) U.S. Cl.
CPC ............ *H04J 3/0685* (2013.01); *H04W 28/26* (2013.01); *H04L 47/14* (2013.01); *H04L 47/805* (2013.01); *H04L 47/10* (2013.01); *H04L 5/0064* (2013.01)
USPC ........... 370/349; 370/276; 370/474; 370/331; 370/395.21; 370/235

(58) Field of Classification Search
USPC ............ 370/278, 276, 474, 331, 349, 395.21, 370/235
See application file for complete search history.

(56) References Cited

U.S. PATENT DOCUMENTS

2002/0143911 A1 10/2002 Vicente et al.
2005/0195858 A1* 9/2005 Nishibayashi et al. ....... 370/474
(Continued)

FOREIGN PATENT DOCUMENTS

EP 1309139 A1 5/2003
WO WO2006033514 3/2006

OTHER PUBLICATIONS

Danguen Seong, EE520 Telecommunication Networks, Communication Networks Research Lab., 2000.

(Continued)

*Primary Examiner* — Nimesh Patel
(74) *Attorney, Agent, or Firm* — QUALCOMM IP Department; James Hunt Yancey, Jr.

(57) ABSTRACT

Techniques for performing traffic classification for uplink and bi-directional traffic streams are described. A station receives packets for transmission on the uplink to an access point. The station identifies packets for each uplink traffic stream and packets for each bi-directional traffic stream based on at least one classification parameter for each traffic stream. The station sends packets for each traffic stream in accordance with at least one QoS parameter for the traffic stream. The access point receives packets for transmission on the downlink to at least one station. The access point identifies packets for each downlink traffic stream and packets for each bi-directional traffic stream based on at least one classification parameter for each traffic stream. The access point sends packets for each traffic stream in accordance with at least one QoS parameter for the traffic stream.

13 Claims, 11 Drawing Sheets

(56) References Cited

U.S. PATENT DOCUMENTS

2006/0039313 A1* 2/2006 Chou et al. .................. 370/328
2008/0031204 A1* 2/2008 Sood ............................ 370/338
2008/0089250 A1* 4/2008 Jung ............................ 370/276

OTHER PUBLICATIONS

European Search Report—EP10005703, Search Authority—Berlin Patent Office, Jun. 28, 2010.
Gahkar K et al: "Iroise: A New QoS Architecture for IEEE 802.16 and IEEE 802.11e Interworking" Broadband Networks, 2005 2nd International Conference on Boston, MA Oct. 3-7, 2005, Piscataway, NJ, USA, IEEE, Oct. 3, 2005, pp. 607-612, XP010.
IEEE Standards Department: "IEEE STD 802.11E/D3.0—Part 11: Wireless Medium Access Control (MAC) and Physical Layer (PHY) Specifications: Medium Access Control (MAC) Enhancements for Quality of Service (Qos)" Internet Citation, [online] May 2002.
International Search Report—PCT/US07/066488, International Search Authority, European Patent Office—Nov. 19, 2007.
Nikos Passas et al., Quality-of-Service-Oriented Medium Access Control for Wireless ATM Networks, IEEE Commun. Mag., vol. 35, Nov. 1997, pp. 42-50.
Written Opinion—PCT/US07/066488, International Searching Authority—European Patent Office, Nov. 19, 2007.

\* cited by examiner

FIG. 2

| Traffic Stream | TCLAS Classification Parameters | TSPEC QoS Parameters | Direction |
|---|---|---|---|
| X | Source IP address = B, Destination IP address = A | Min Data Rate = a Nominal MSDU size = b | Downlink |
| Y | Source IP address = B, Destination IP address = A | Min Service Interval = c Delay Bound = d | Bi-directional |
| Z | Source IP address = A, Destination IP address = B | Min Data Rate = e Burst Size = f | Uplink |
| ... | ... | ... | ... |

*FIG. 4*

UPLINK AND BI-DIRECTIONAL TRAFFIC CLASSIFICATION FOR WIRELESS COMMUNICATION

CLAIM OF PRIORITY UNDER 35 U.S.C. §119

The present application for patent claims priority to Provisional Application No. 60/792,001 entitled "UPLINK AND BI-DIRECTIONAL TRAFFIC CLASSIFICATION FOR WIRELESS COMMUNICATION DEVICES" filed Apr. 12, 2006, and assigned to the assignee hereof and hereby expressly incorporated by reference herein.

BACKGROUND

I. Field

The present disclosure relates generally to communication, and more specifically to techniques for transmitting data in a wireless communication network.

II. Background

Wireless communication networks are widely deployed to provide various communication services such as voice, video, packet data, messaging, and so on. These networks may be capable of supporting communication for multiple users by sharing the available network resources. Examples of such networks include wireless local area networks (WLANs), wireless wide area networks (WWANs), and wireless metropolitan area networks (WMANs).

Different services may have different traffic characteristics and hence different transmission requirements for acceptable performance. For example, a voice call may send small amounts of data periodically and may have relatively stringent delay requirements. Satisfactory performance may be achieved for the voice call by allocating a fixed amount of network resources for the voice call. In contrast, a packet data call may send large bursts of data sporadically but may be able to tolerate variable delays. Satisfactory performance may be achieved for the packet data call by providing a sufficient data rate whenever there is data to send.

There is therefore a need in the art for techniques to transmit different types of data such that acceptable performance may be achieved for all data types.

SUMMARY

Techniques for performing traffic classification at a station for uplink and bi-directional traffic streams are described herein. Techniques for performing traffic classification at an access point for bi-directional traffic streams are also described herein. These techniques may be used to achieve the desired quality of service (QoS) for uplink and bi-directional traffic streams. A traffic stream may carry any type of data for any service.

In an embodiment, a station receives packets for transmission on the uplink to an access point. The station identifies packets for each of at least one traffic stream based on at least one classification parameter for the traffic stream. The station then sends packets for each traffic stream in accordance with at least one QoS parameter for the traffic stream.

In an embodiment, an access point receives packets for transmission on the downlink to at least one station. The access point identifies packets for the bi-directional traffic stream based on at least one classification parameter for the traffic stream. The access point then sends the packets for the bi-directional traffic stream in accordance with at least one QoS parameter for the traffic stream.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 2 shows an exemplary protocol stack.

FIG. 4 shows exemplary TCLASs and TSPECs for three traffic streams.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The traffic classification techniques described herein may be used for various wireless networks such as WLANs, WWANs, WMANs, and so on. A WLAN may implement one or more standards in the IEEE 802.11 family of standards developed by The Institute of Electrical and Electronics Engineers (IEEE) for WLANs. A WWAN may be a CDMA network, a TDMA network, an FDMA network, an OFDMA network, or some other network.

Figure 1:
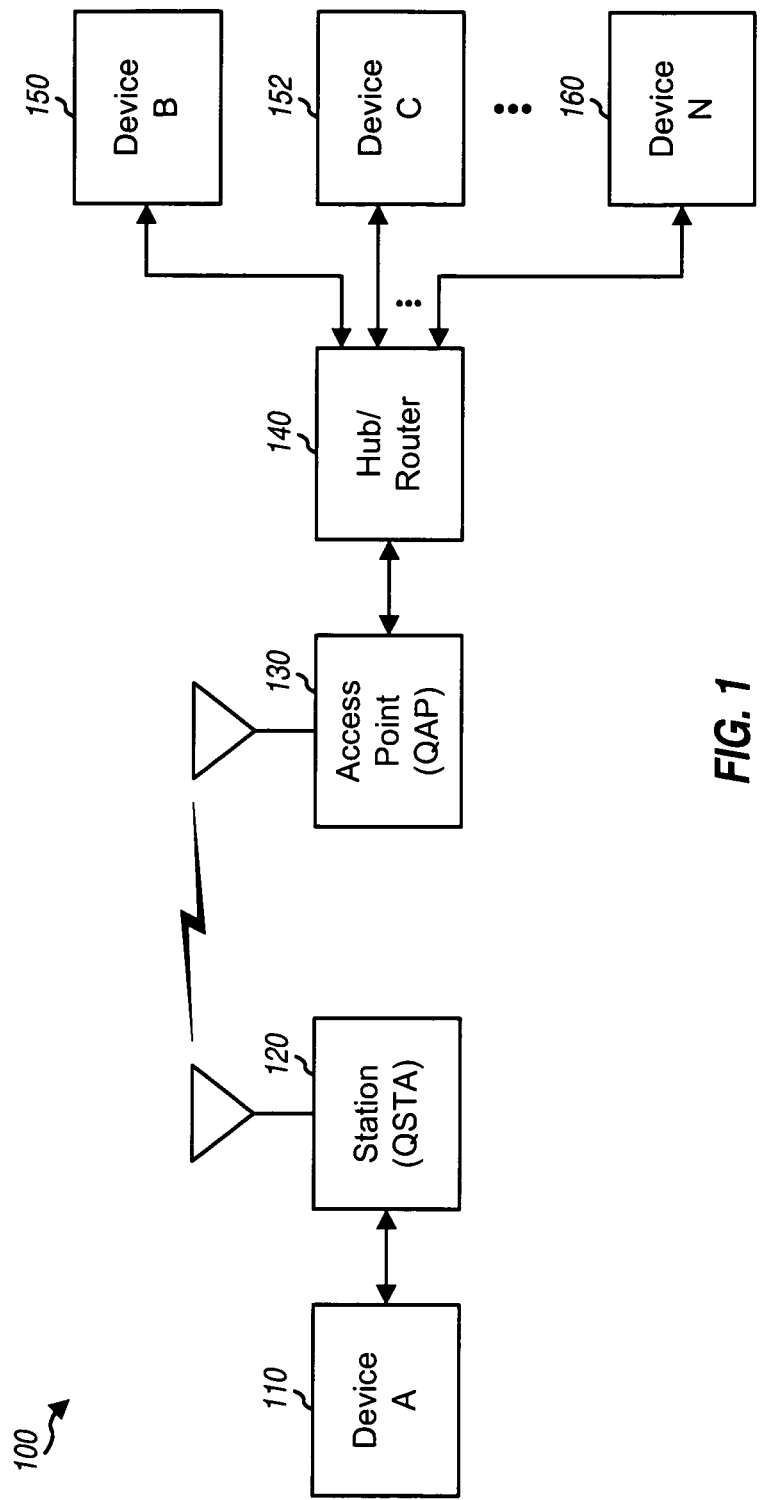
FIG. 1 shows a station and an access point in a wireless network.

FIG. 1 shows a wireless network 100 with a station 120 and an access point 130. In general, a wireless network may include any number of access points and any number of stations. A station is a device that can communicate with another station via a wireless medium. The terms "wireless medium", "wireless channel" and "channel" are often used interchangeably. A station may also be called, and may contain some or all of the functionality of, a terminal, a mobile station, a user equipment, a subscriber station, and/or some other entity. A station may be a cellular phone, a handheld device, a wireless device, a personal digital assistant (PDA), a laptop computer, a wireless modem card, a cordless phone, and so on. An access point is a station that provides access to distribution services via the wireless medium for stations associated with that access point. An access point may also be called, and may contain some or all of the functionality of, a base station, a base transceiver subsystem (BTS), a Node B, and/or some other network entity.

In the embodiment shown in FIG. 1, station 120 couples to a device 110 and supports data connectivity for device 110. Device 110 may be a laptop computer, a personal computer, or some other device. Access point 130 couples to a hub/router 140 that further couples to devices 150 through 160. In general, station 120 and access point 130 may each be coupled to any number of devices and may provide data connectivity for these devices.

Wireless network 100 may be a WLAN that implements the IEEE 802.11 family of standards. For example, wireless network 100 may implement IEEE 802.11, 802.11a, 802.11b, 802.11e and/or 802.11g, which are existing IEEE 802.11 standards. Wireless network 100 may also implement IEEE 802.11n and/or 802.11s, which are IEEE 802.11 standards being formed. IEEE 802.11, 802.11a, 802.11b, 802.11g, and 802.11n cover different radio technologies and have different capabilities. IEEE 802.11e covers QoS enhancements for a Medium Access Control (MAC) layer. In IEEE 802.11e, a station that supports QoS facility is referred to as QSTA, and an access point that supports QoS facility is referred to as QAP. QoS facility refers to mechanisms used to provide parameterized and prioritized QoS.

Figure 2:
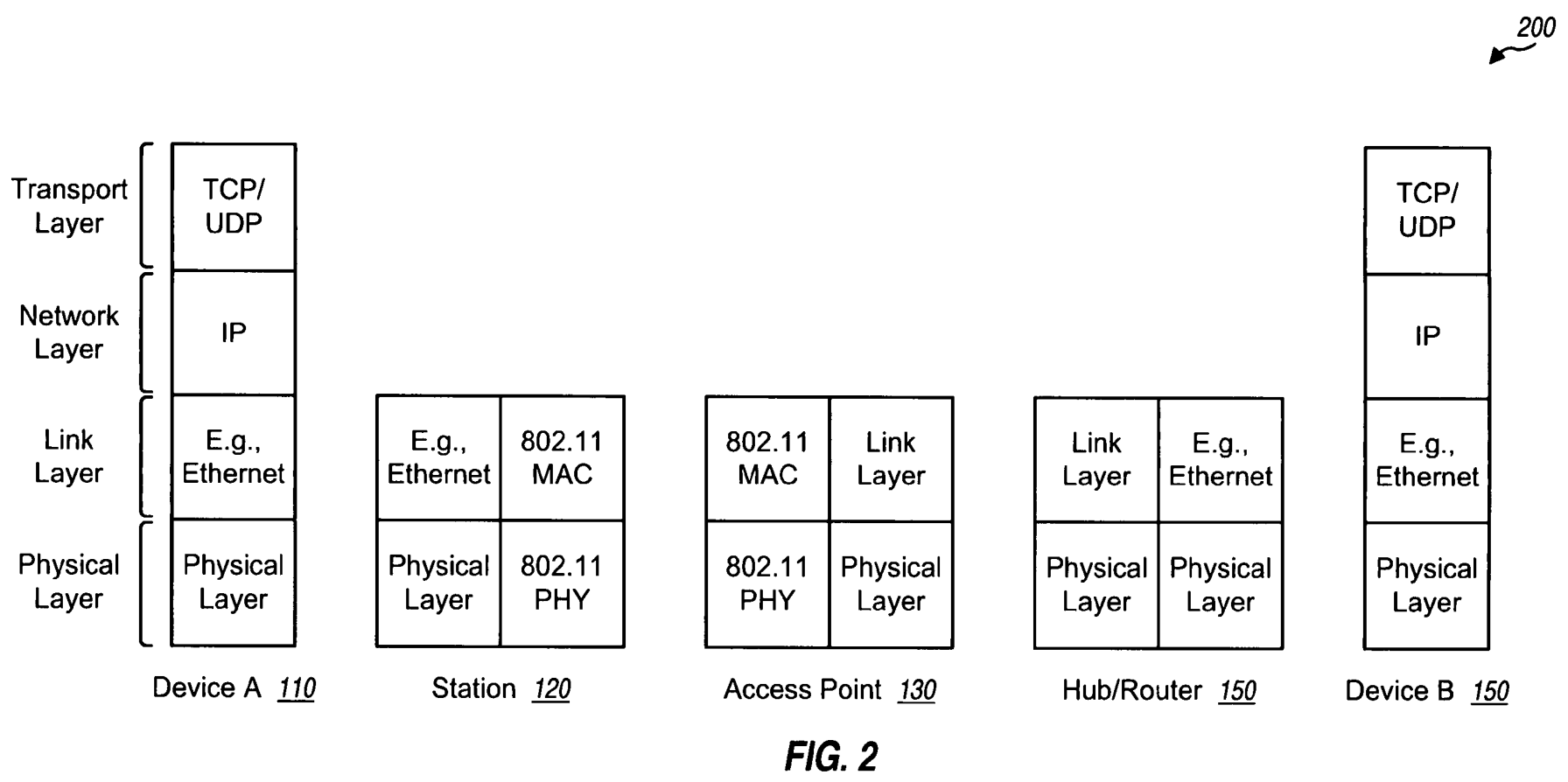

FIG. 2 shows an exemplary protocol stack 200 for data communication between devices 110 and 150 in FIG. 1. The protocol stack includes a transport layer, a network layer, a link layer, and a physical layer. Device 110 may communicate with device 150 using Transmission Control Protocol (TCP), User Datagram Protocol (UDP), or some other protocol at the transport layer. TCP and UDP typically operate on top of Internet Protocol (IP) at the network layer. Transport layer data (e.g., for TCP and/or UDP) is encapsulated in IP packets, which are exchanged between devices 110 and 150 via station 120, access point 130, and hub/router 140. Each entity communicates with another entity. Station 120 and access point 130 communicate according to protocols specified by IEEE 802.11 MAC and an IEEE 802.11 physical layer (PHY). The link layer for the other entities (e.g., device 110 and/or 150) may be Ethernet or some other protocol. The physical layer for the other entities may be any suitable physical layer protocol.

Figure 3:
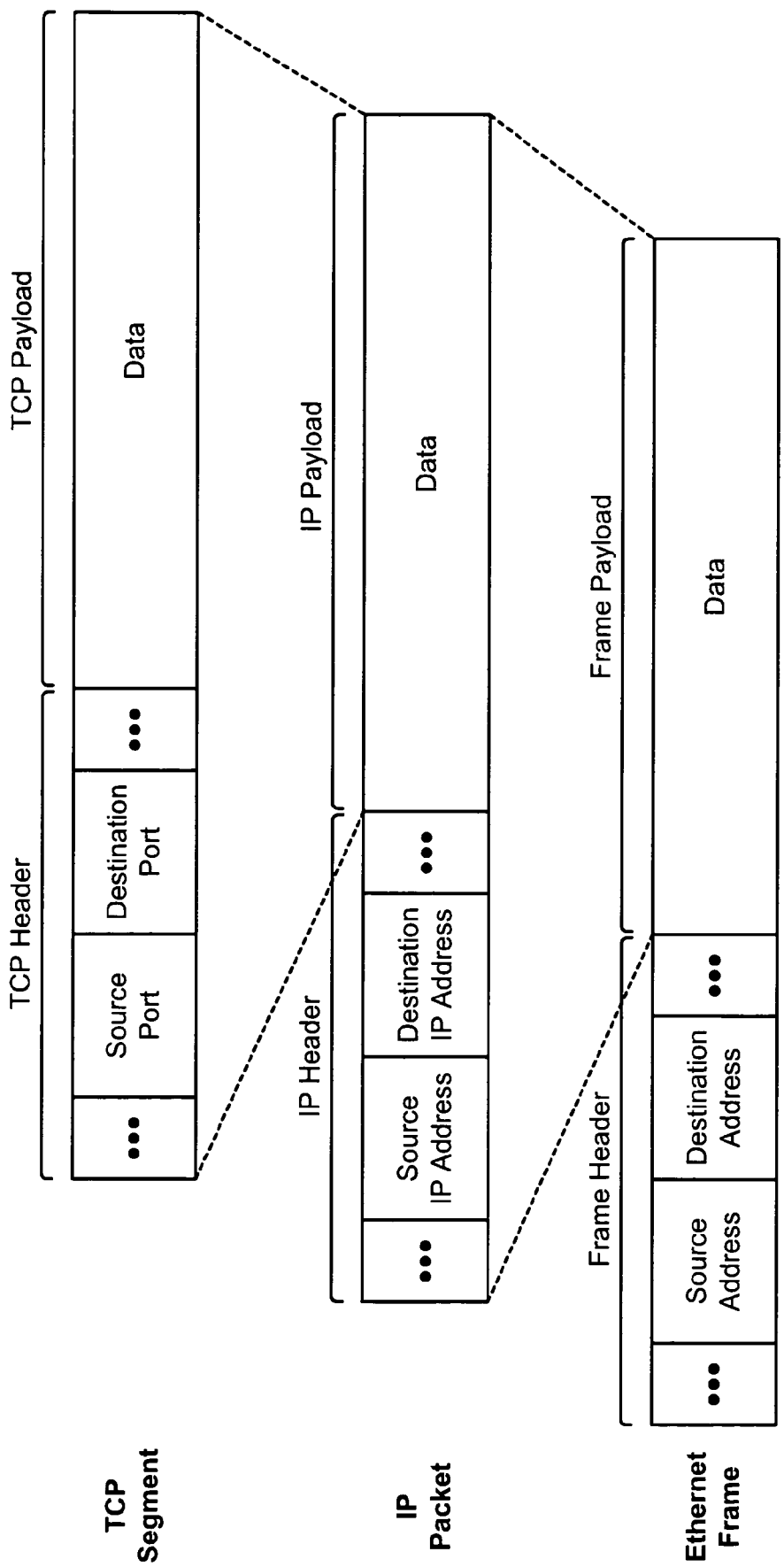
FIG. 3 shows data units at transport, network, and link layers.

FIG. 3 shows data units for the transport, network, and link layers. For TCP at the transport layer, data is sent as TCP segments. Each TCP segment includes a TCP header and a TCP payload. The TCP header includes a source port and a destination port, where a port indicates a logical channel associated with the data in the payload. For IP at the network layer, data is sent as IP packets or datagrams. Each IP packet includes an IP header and an IP payload. The IP header includes a source IP address and a destination IP address for a source device and a destination device, respectively, for the IP packet. The IP payload may carry a TCP segment or some other data. IP packets may be encapsulated in Ethernet frames or some other link layer frames. Each Ethernet frame includes a header containing a source address and a destination address and a payload containing network layer data.

A station (QSTA) may communicate with an access point (QAP) for one or more traffic streams. A traffic stream may carry any type of data (e.g., voice, video, email, web and/or some other data) for higher layer (e.g., TCP or UDP). A traffic stream may be a downlink traffic stream, an uplink traffic stream, or a bi-directional traffic stream. A downlink traffic stream carries data from an access point to a station. An uplink traffic stream carries data from a station to an access point. A bi-directional traffic stream carries data for both the downlink and uplink. A station may have any number of downlink, uplink and bi-directional traffic streams at any given moment. Each traffic stream is identified by (1) a traffic stream identifier (TSID) and a direction at a station and (2) the TSID, the direction, and a station address at an access point.

A traffic stream may be associated with a traffic specification (TSPEC) and/or a traffic classification (TCLAS). The TSPEC describes the traffic characteristics and the QoS requirements of the traffic stream. The TCLAS specifies parameters used to identify MAC service data units (MSDUs) belonging to the traffic stream so that these MSDUs can be sent in accordance with the TSPEC for the traffic stream. For simplicity, MSDUs are referred to as packets in much of the description below.

In IEEE 802.11e, a station is responsible for the creation of a traffic stream regardless of its direction. A TSPEC may be defined for the traffic stream at the station based on application requirements and then negotiated with an access point. A TCLAS may be also defined for the traffic stream and linked to the TSPEC. For a downlink traffic stream, the station may send the TCLAS in one or more TCLAS elements to the access point. The access point may then apply the parameters in the TCLAS element(s) to identify downlink packets belong to the traffic stream. IEEE 802.11e supports traffic classification for downlink traffic streams, but not for uplink traffic streams or bi-directional traffic streams.

Techniques for performing traffic classification at a station for uplink and bi-directional traffic streams are described herein. Techniques for performing traffic classification at an access point for bi-directional traffic streams are also described herein. These techniques support a user-definable policy that may be applied to traffic for uplink and bi-directional traffic streams. These techniques are useful for various applications, including multi-media applications such as streaming video and voice over IP (VoIP) having specific requirements on packet latency. Latency may be guaranteed by classifying traffic into one or more traffic streams that have negotiated QoS parameters to support video and voice.

A TCLAS for a traffic stream may utilize one or more parameters to classify packets belonging to the traffic stream. IEEE 802.11e supports the following classification parameters:
  Ethernet—source address, destination address, and type;
  IP—source IP address, destination IP address, version (IPv4 or IPv6), and flow label (for IPv6);
  TCP/UDP—source port, destination port, and protocol; and
  IEEE 802.11d/q—user priority and VLAN ID.

For simplicity, the term "source address" can refer to an Ethernet source address, a source IP address, a TCP source port, a UDP source port, some other type of source address or port, or any combination thereof. The term "destination address" can refer to an Ethernet destination address, a destination IP address, a TCP destination port, a UDP destination port, some other type of destination address or port, or any combination thereof.

A TSPEC for a traffic stream may specify one or more QoS parameters applicable to the traffic stream. IEEE 802.11e supports the following QoS parameters:
  Data rate—minimum, mean, and peak data rates, burst size, minimum PHY rate;
  Service interval/time—nominal and maximum service intervals, inactivity interval, suspension interval, and service start time;
  MSDU size—nominal and maximum MSDU sizes; and
  Delay—delay bound.

The classification parameters or TCLAS and the QoS parameters for TSPEC are described in IEEE 802.11e, entitled "Amendment: Medium Access Control (MAC) Quality of Service (QoS) Enhancements," which is publicly available.

FIG. 4 shows exemplary TCLASs and TSPECs for three traffic streams exchanged between station 120 and access point 130 in FIG. 1. In this example, traffic stream X is a downlink traffic stream sent from device 150 with an IP address of B to device 110 with an IP address of A. Traffic stream Y is a bi-directional traffic stream exchanged between devices 110 and 150. Traffic stream Z is an uplink traffic stream sent from device 110 to device 150. In this example, the source and destination IP addresses are used as the classification parameters for each traffic stream and are given in FIG. 4. Exemplary QoS parameters for each traffic stream are also given in FIG. 4. In general, the TCLAS for each traffic stream may include any set of classification parameters, and the TSPEC for each traffic stream may include any set of QoS parameters.

Station 120 and access point 130 may negotiate the QoS parameters for each traffic stream. After the traffic streams are accepted by access point 130, station 120 may send the TCLAS for downlink traffic stream X in one or more TCLAS elements to access point 130 and may also send the TCLAS for bi-directional traffic stream Y in one or more TCLAS elements. Access point 130 classifies downlink packets for traffic streams X and Y based on the classification parameters for these streams. Station 120 classifies uplink packets for traffic streams Y and Z based on the classification parameters for these streams.

Figure 5:
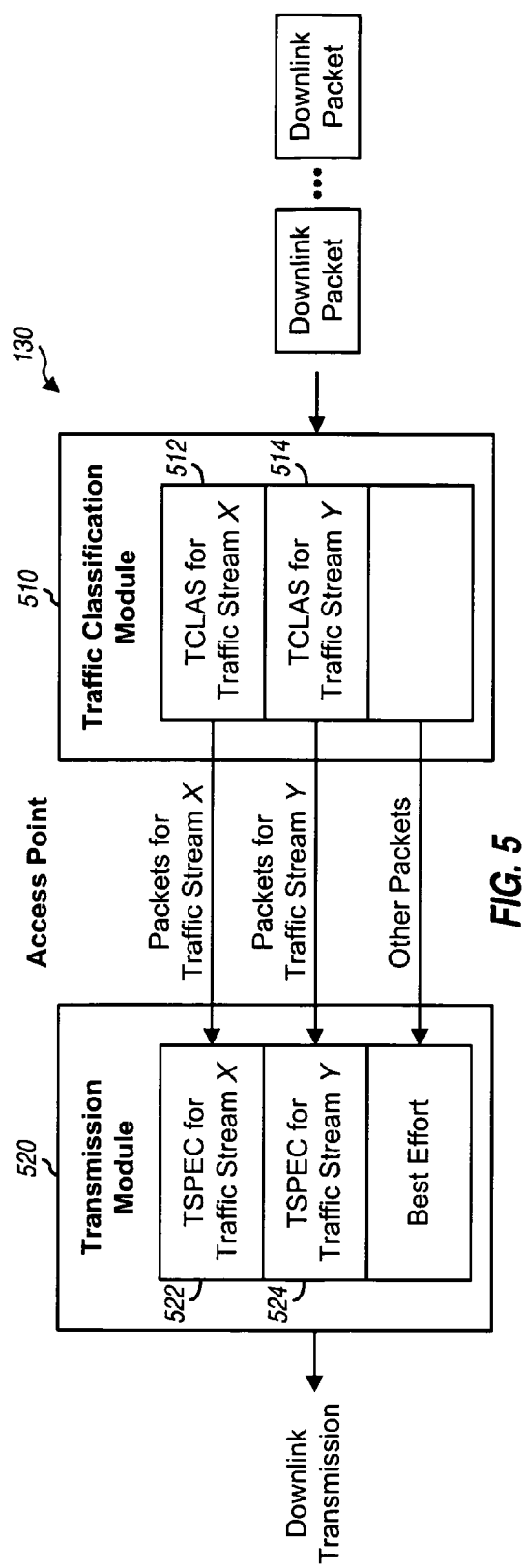
FIG. 5 shows traffic classification and transmission at the access point.

FIG. 5 shows traffic classification and transmission at access point 130 for the exemplary traffic streams shown in FIG. 4. Within access point 130, a traffic classification module 510 includes a TCLAS 512 with at least one classification parameter for traffic stream X and a TCLAS 514 with at least one classification parameter for traffic stream Y. Module 510 receives downlink packets to be sent to stations and determines whether each downlink packet is for traffic stream X or Y based on the classification parameters for these traffic streams. A transmission module 520 includes a TSPEC 522 with at least one QoS parameter for traffic stream X and a TSPEC 524 with at least one QoS parameter for traffic stream Y. Module 520 receives the downlink packets from module 510, sends packets for traffic stream X in accordance with the QoS parameter(s) for this traffic stream, sends packets for traffic stream Y in accordance with the QoS parameter(s) for this traffic stream, and sends the other packets, e.g., using best effort.

Figure 6:
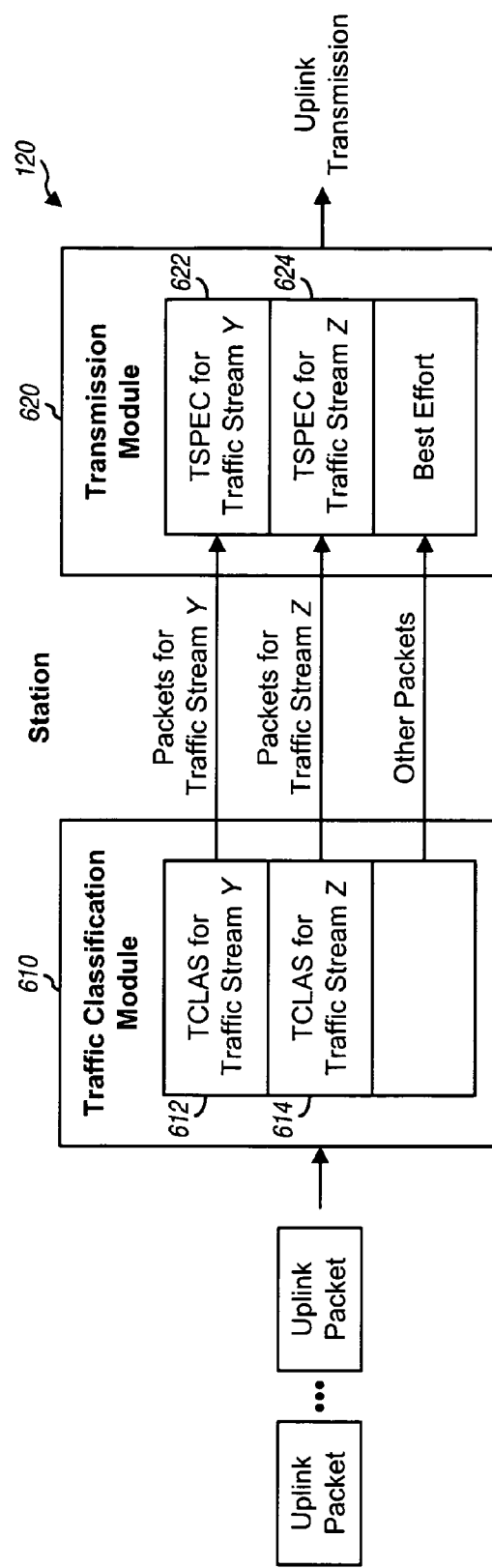
FIG. 6 shows traffic classification and transmission at the station.

FIG. 6 shows traffic classification and transmission at station 120 for the exemplary traffic streams shown in FIG. 4. Within station 120, a traffic classification module 610 includes a TCLAS 612 with at least one classification parameter for traffic stream Y and a TCLAS 614 with at least one classification parameter for traffic stream Z. Module 610 receives uplink packets to be sent to access point 130 and determines whether each uplink packet is for traffic stream Y or Z based on the classification parameters for these traffic streams. A transmission module 620 includes a TSPEC 622 with at least one QoS parameter for traffic stream Y and a TSPEC 624 with at least one QoS parameter for traffic stream Z. Module 620 receives the uplink packets from module 610, sends packets for traffic stream Y in accordance with the QoS parameter(s) for this traffic stream, sends packets for traffic stream Z in accordance with the QoS parameter(s) for this traffic stream, and sends the other packets, e.g., using best effort.

In an embodiment, a single TCLAS is used for a traffic stream with a TSPEC. This TCLAS includes all parameters used to classify packets for the traffic stream. In this embodiment, TCLAS 514 for traffic stream Y at access point 130 in FIG. 5 is the same as TCLAS 612 for traffic stream Y at station 120 in FIG. 6. The traffic classification may be performed in different manners depending on (1) whether the traffic stream is a uni-directional traffic stream or a bi-directional traffic stream and (2) whether the traffic classification is performed at station 120 or access point 130.

Figure 7:
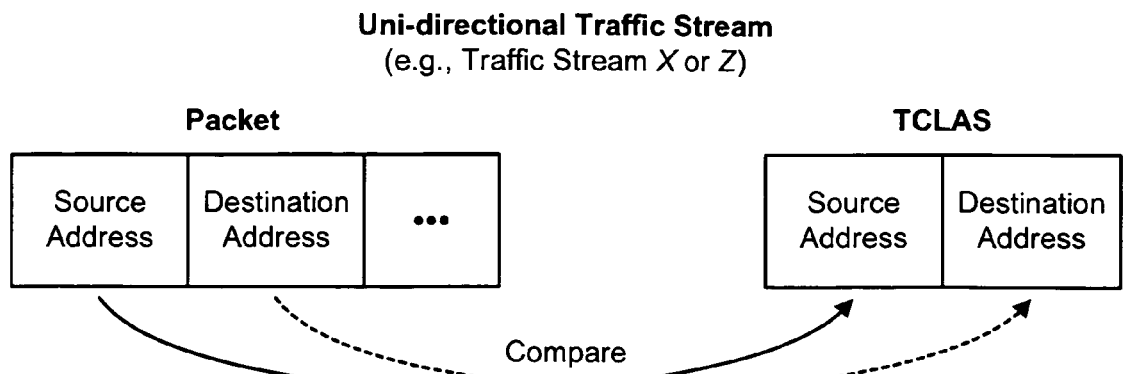
FIG. 7 shows traffic classification for a uni-directional traffic stream.

FIG. 7 illustrates traffic classification for a uni-directional traffic stream at either station 120 or access point 130. For the example shown in FIG. 4, access point 130 may perform this traffic classification for downlink traffic stream X, and station 120 may perform this traffic classification for uplink traffic stream Z. For each incoming packet to be sent, the source address of the packet is compared against the source address in the TCLAS for the traffic stream, and the destination address of the packet is compared against the destination address in the TCLAS. The packet belongs to the traffic stream if both the source and destination addresses match.

In an embodiment, a TCLAS for a bi-directional traffic stream is defined from the perspective of access point 130. Hence, access point 130 may use the classification parameters in the TCLAS to classify downlink packets for the bi-directional traffic stream in the same manner as for a downlink traffic stream. However, station 120 may apply the classification parameters in the TCLAS in the opposite manner, as described below, to classify uplink packets for the bi-directional traffic stream.

Figure 8A:
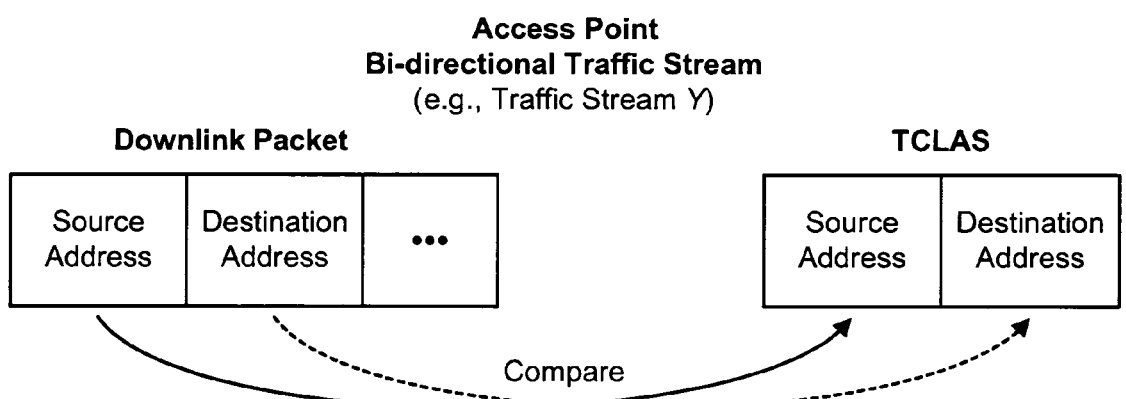
FIGS. 8A and 8B show traffic classification for a bi-directional traffic stream.

FIG. 8A illustrates traffic classification for a bi-directional traffic stream at access point 130. For the example shown in FIG. 4, access point 130 may perform this traffic classification for bi-directional traffic stream Y. For each downlink packet to be sent by access point 130, the source address of the packet is compared against the source address in the TCLAS for the bi-directional traffic stream, and the destination address of the packet is compared against the destination address in the TCLAS. The downlink packet belongs to the bi-directional traffic stream if both the source and destination addresses match.

Figure 8B:
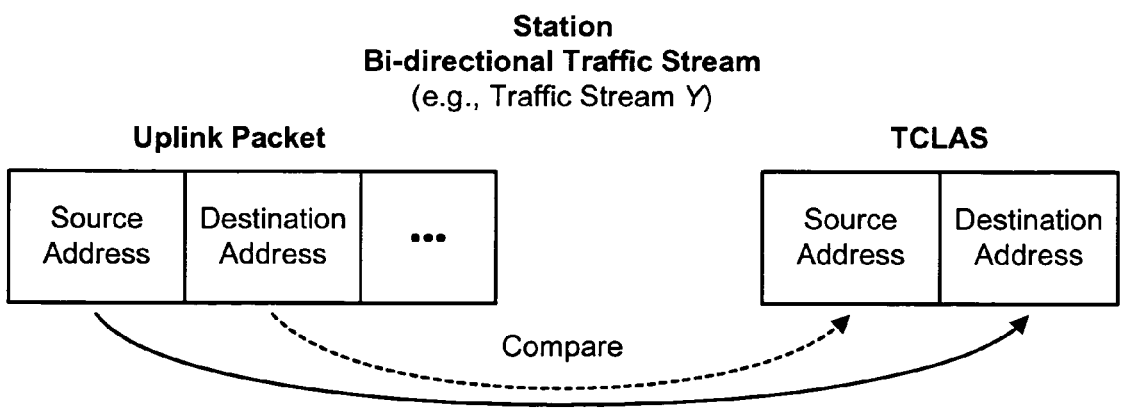

FIG. 8B illustrates traffic classification for a bi-directional traffic stream at station 120. For the example shown in FIG. 4, station 120 may perform this traffic classification for bi-directional traffic stream Y. For each uplink packet to be sent by station 120, the source address of the packet is compared against the destination address in the TCLAS for the bi-directional traffic stream, and the destination address of the packet is compared against the source address in the TCLAS. The uplink packet belongs to the bi-directional traffic stream if the source and destination addresses of the packet match the destination and source addresses, respectively, of the TCLAS.

As an example, with the TCLAS for bi-directional traffic stream Y shown in FIG. 4, a downlink packet with a source IP address of B and a destination IP address of A would result in a match for traffic stream Y. An uplink packet with a source IP address of B and a destination IP address of A would not result in a match for traffic stream Y. An uplink packet with a source IP address of A and a destination IP address of B would result in a match for traffic stream Y.

Figure 9:
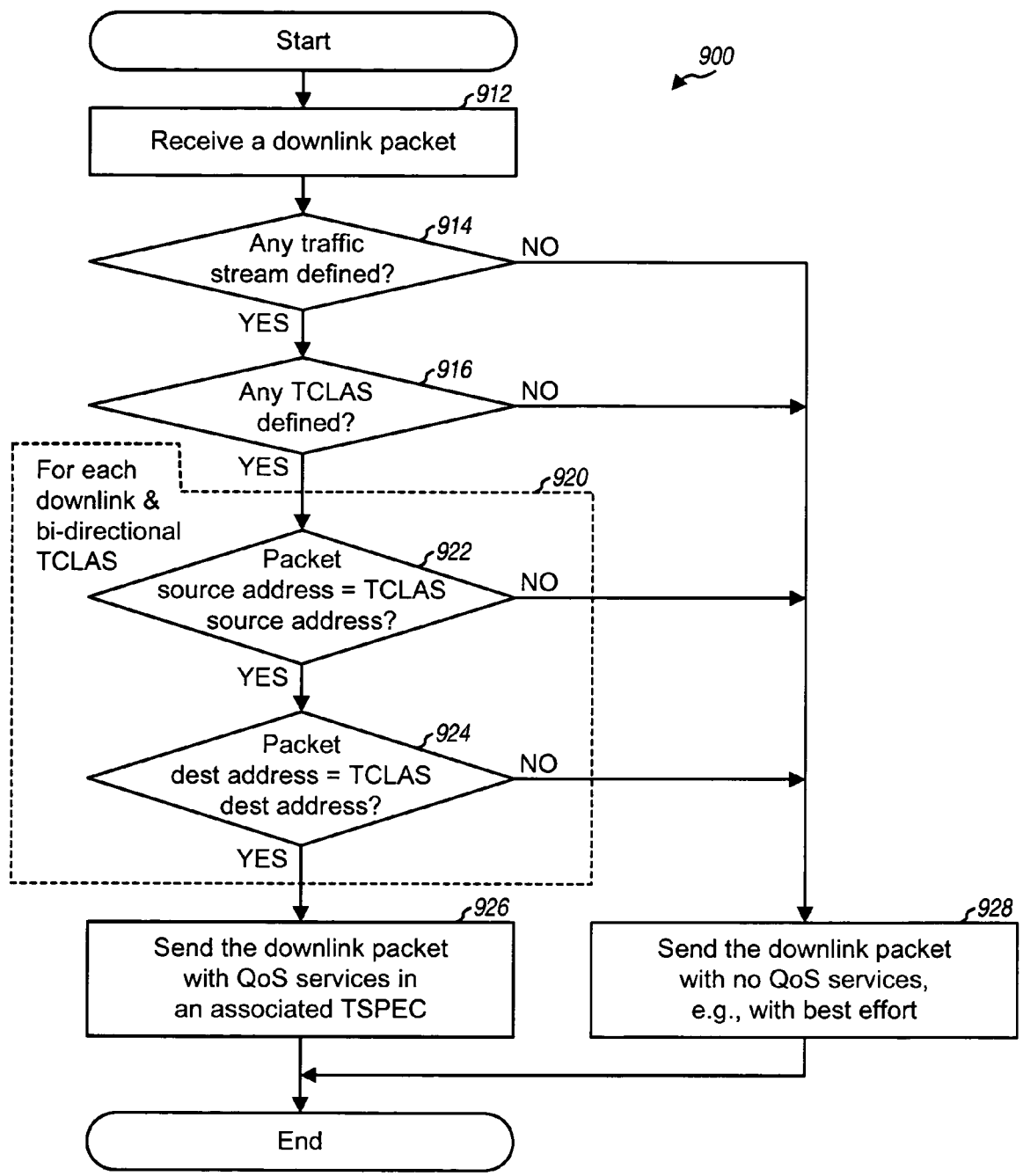
FIG. 9 shows a traffic classification process performed by the access point.

FIG. 9 shows an embodiment of a process 900 performed by access point 130 for traffic classification for downlink and bi-directional traffic streams. A downlink packet is initially received (block 912). A determination is made whether any downlink or bi-directional traffic stream is defined (block 914). If the answer is 'Yes' for block 914, then a determination is made whether a TCLAS is defined for any downlink or bi-directional traffic stream (block 916). If the answer is 'No' for block 914 or 916, then the packet is sent with no QoS services, e.g., with best effort (block 928).

If the answer is 'Yes' for block 916, then block 920 is performed for each TCLAS for a downlink traffic stream and for each TCLAS for a bi-directional traffic stream. For the first TCLAS, the source address of the packet is compared against the source address in the TCLAS (block 922). If the source address matches, then the destination (dest) address of the packet is compared against the destination address in the TCLAS (block 924). If both the source and destination addresses match for the TCLAS, then the packet is sent with the QoS services in the associated TSPEC (block 926). If the source address and/or the destination address do not match for the first TCLAS, then traffic classification is performed with another TSPEC, if any. If the source address and/or the destination address do not match for any TCLAS, then the packet is sent with no QoS services, e.g., with best effort (block 928).

Figure 10:
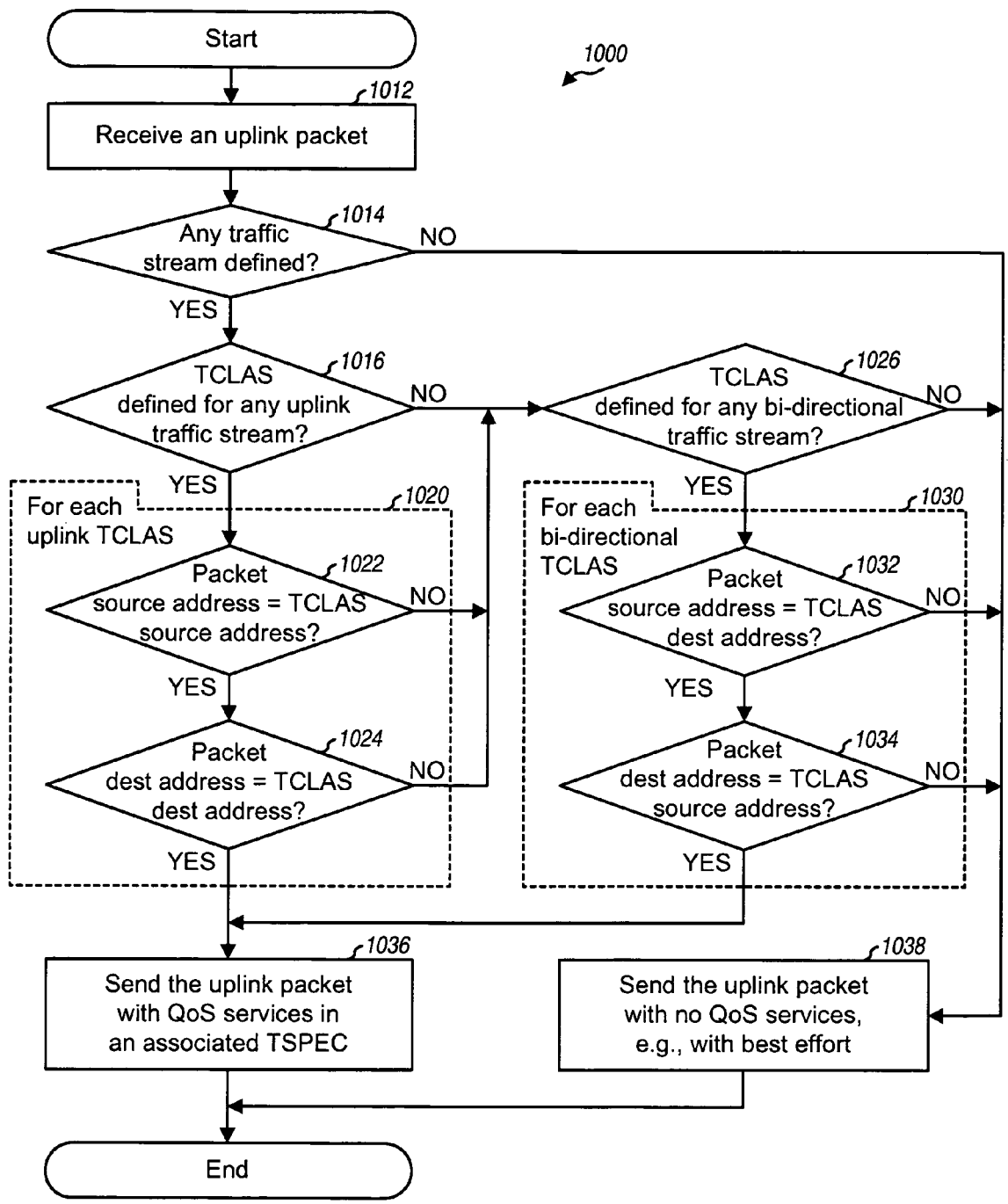
FIG. 10 shows a traffic classification process performed by the station.

FIG. 10 shows an embodiment of a process 1000 performed by station 120 for traffic classification for uplink and bi-directional traffic streams. An uplink packet is initially received (block 1012). A determination is made whether any uplink or bi-directional traffic stream is defined (block 1014). If the answer is 'No' for block 1014, then the packet is sent with no QoS services, e.g., with best effort (block 1038). Otherwise, a determination is made whether a TCLAS is defined for any uplink traffic stream (block 1016). If the answer is 'No' for block 1016, then the process proceeds to block 1026.

If the answer is 'Yes' for block 1016, then block 1020 is performed for each TCLAS for an uplink traffic stream (or uplink TCLAS). For the first uplink TCLAS, the source address of the packet is compared against the source address in the TCLAS (block 1022). If the source address matches, then the destination address of the packet is compared against the destination address in the TCLAS (block 1024). If both the source and destination addresses match for the TCLAS, then the packet is sent with the QoS services in the associated TSPEC (block 1036). If the source address and/or the destination address do not match for the first uplink TCLAS, then traffic classification is performed with another uplink TSPEC, if any. If the source address and/or the destination address do not match for any uplink TCLAS, then the process proceeds to block 1026.

In block 1026, a determination is made whether a TCLAS is defined for any bi-directional traffic stream. If the answer is 'No' for block 1026, then the packet is sent with no QoS services (block 1038). Otherwise, block 1030 is performed for each TCLAS for a bi-directional traffic stream (or bi-directional TCLAS). For the first bi-directional TCLAS, the source address of the packet is compared against the destination address in the TCLAS (block 1032). If the addresses match, then the destination address of the packet is compared against the source address in the TCLAS (block 1034). If both the source and destination addresses match for the TCLAS, then the packet is sent with the QoS services in the associated TSPEC (block 1036). If the source address and/or the destination address do not match for the first bi-directional TCLAS, then traffic classification is performed with another bi-directional TSPEC, if any. If the source address and/or the destination address do not match for any bi-directional TCLAS, then the packet is sent with no QoS services (block 1038).

FIGS. 8A through 10 are for an embodiment in which a single TCLAS is used at both station 120 and access point 130 for a bi-directional traffic stream. In another embodiment, two versions of the TCLAS are generated for the bi-directional traffic stream. One version is equal to the original TCLAS and is used at access point 130 for traffic classification. Another version has (1) its source address set to the destination address in the original TCLAS and (2) its destination address set to the source address in the original TCLAS. Station 120 may use this version for traffic classification in the same manner as a TCLAS for an uplink traffic stream.

Figure 11:
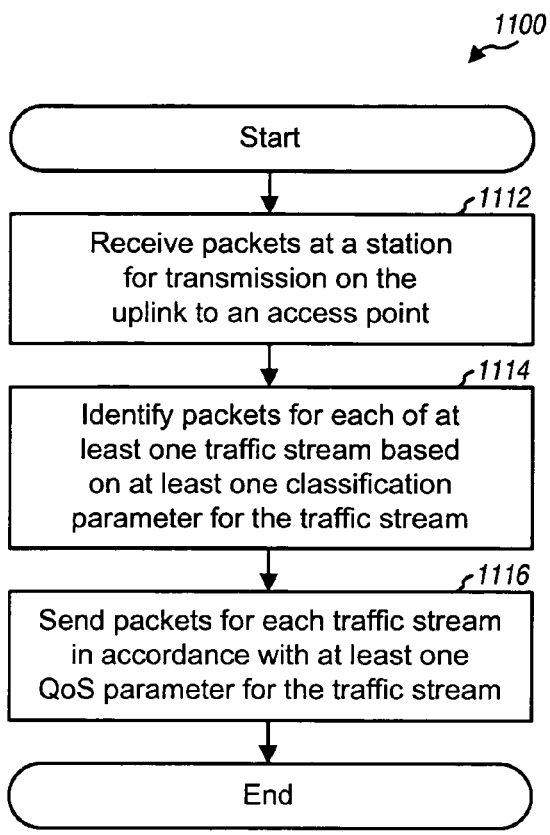
FIGS. 11 and 12 show a process and an apparatus, respectively, for classifying traffic for uplink and bi-directional traffic streams.

FIG. 11 shows an embodiment of a process 1100 for classifying traffic for uplink and bi-directional traffic streams. Packets are received at a station for transmission on the uplink to an access point (block 1112). Packets for each of at least one traffic stream are identified based on at least one classification parameter for the traffic stream (block 1114). Packets for each traffic stream are sent in accordance with at least one QoS parameter for the traffic stream (block 1116).

Each traffic stream may be associated with a respective TCLAS having a source address and a destination address as the at least one classification parameter for that traffic stream. The source address may be an Ethernet source address, a source IP address, a source port, or a combination thereof. The destination address may be an Ethernet destination address, a destination IP address, a destination port, or a combination thereof. Each traffic stream may also be associated with a TSPEC having the at least one QoS parameter for the traffic stream. The QoS for each traffic stream may be negotiated between the station and the access point, and the TCLAS for each traffic stream may be sent to the access point.

The at least one traffic stream may comprise an uplink traffic stream. For each received packet, a source address of the packet may be compared against the source address in the TCLAS for the uplink traffic stream, a destination address of the packet may be compared against the destination address in the TCLAS, and whether the packet belongs to the uplink traffic stream may be determined based on the results of the comparisons. Additional or alternatively, the at least one traffic stream may comprise a bi-directional traffic stream. For each received packet, a source address of the packet may be compared against the destination address in the TCLAS for the bi-directional traffic stream, a destination address of the packet may be compared against the source address in the TCLAS, and whether the packet belongs to the bi-directional traffic stream may be determined based on the results of the comparisons. The traffic classification may be performed if the at least one traffic stream is defined and if a TSPEC is defined for any traffic stream or may be skipped otherwise.

Figure 12:
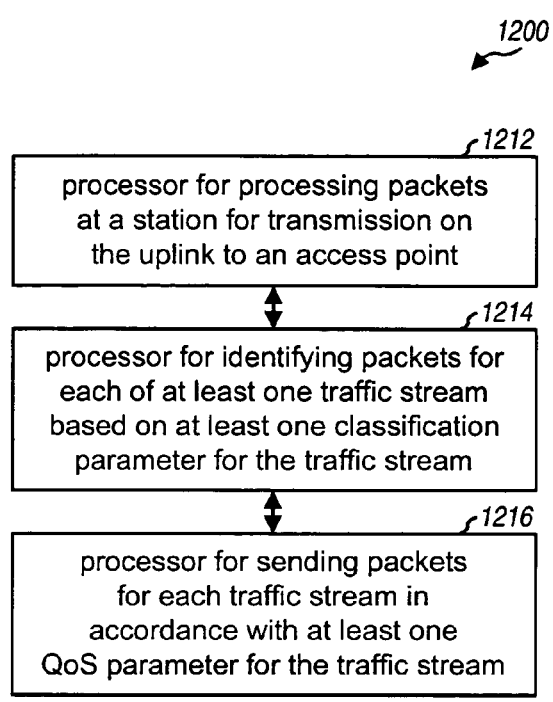

FIG. 12 shows an embodiment of an apparatus 1200 for classifying traffic for uplink and bi-directional traffic streams. Apparatus 1200 includes one or more processors 1212 for processing packets at a station for transmission on the uplink to an access point coupled with one or more processors 1214 for identifying packets for each of at least one traffic stream based on at least one classification parameter for the traffic stream. One ore more processors 1214 are coupled with one or more processors 1216 for sending packets for each traffic stream in accordance with at least one QoS parameter for the traffic stream.

Figures 13, 14:
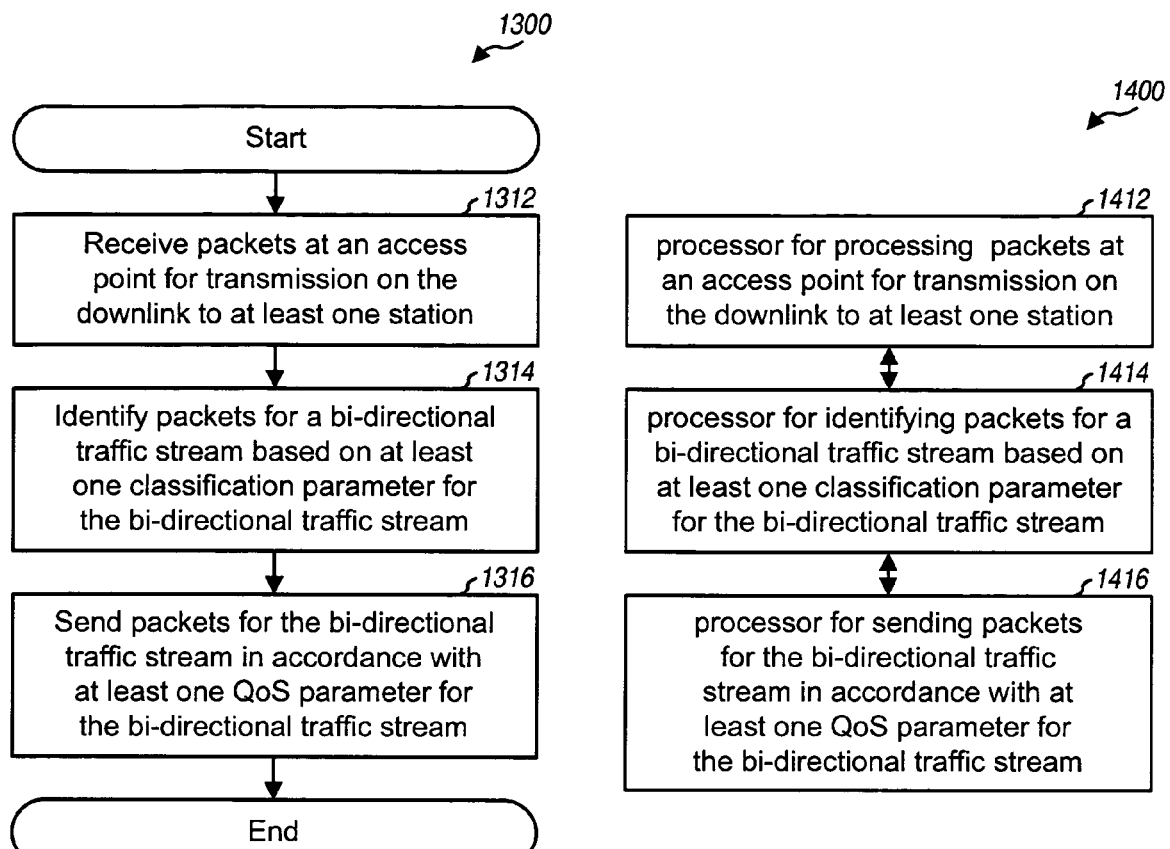
FIGS. 13 and 14 show a process and an apparatus, respectively, for classifying traffic for a bi-directional traffic stream.

FIG. 13 shows an embodiment of a process 1300 for classifying traffic for a bi-directional traffic stream. Packets are received at an access point for transmission on the downlink to at least one station (block 1312). Packets for the bi-directional traffic stream are identified based on at least one classification parameter for the bi-directional traffic stream (block 1314). Packets for the bi-directional traffic stream are sent in accordance with at least one QoS parameter for the bi-directional traffic stream (block 1316).

In block 1314, for each received packet, a source address of the packet may be compared against the source address in a TCLAS for the bi-directional traffic stream, a destination address of the packet may be compared against the destination address in the TCLAS, and whether the packet belongs to the bi-directional traffic stream may be determined based on the results of the comparisons. The TCLAS may be received from a station requesting the bi-directional traffic stream.

FIG. 14 shows an embodiment of an apparatus 1400 for classifying traffic for a bi-directional traffic stream. Apparatus 1400 includes one or more processors 1412 for processing packets at an access point for transmission on the downlink to at least one station coupled with one or more processors 1414 for identifying packets for the bi-directional traffic stream based on at least one classification parameter for the bi-directional traffic stream. One or more processors 1414 are coupled with one ore more processors 1416 for sending packets for the bi-directional traffic stream in accordance with at least one QoS parameter for the bi-directional traffic stream.

The traffic classification techniques described herein provide a user with flexibility to map packets for uplink and bi-directional traffic streams. The classification may be based on TCP, UDP, IP, Ethernet, and/or IEEE 802.1Q parameters. The traffic streams may be enhanced distributed channel access (EDCA) traffic streams and/or hybrid coordination function (HCF) controlled channel access (HCCA) traffic streams in IEEE 802.11. The QoS for each traffic stream may be defined using appropriate QoS parameters and negotiated to obtain the desired performance (e.g., bandwidth and delay).

Without the ability to classify packets into traffic streams, a user may need to rely on applications at endpoints to set Type of Service (TOS) bits in IP headers. A station may then map a TOS value to one of four traffic categories: background (BK), best effort (BE), video (VI), and voice (VO). In general, VO traffic receives better service than VI traffic, which receives better service than BE traffic, which receives better service than BK traffic. However, the user may not be able to better differentiate the four traffic categories and may not be able to control how much bandwidth should be reserved for each traffic category. The techniques described herein give the user greater flexibility and granularity of control over uplink and bi-directional traffic.

Figure 15:
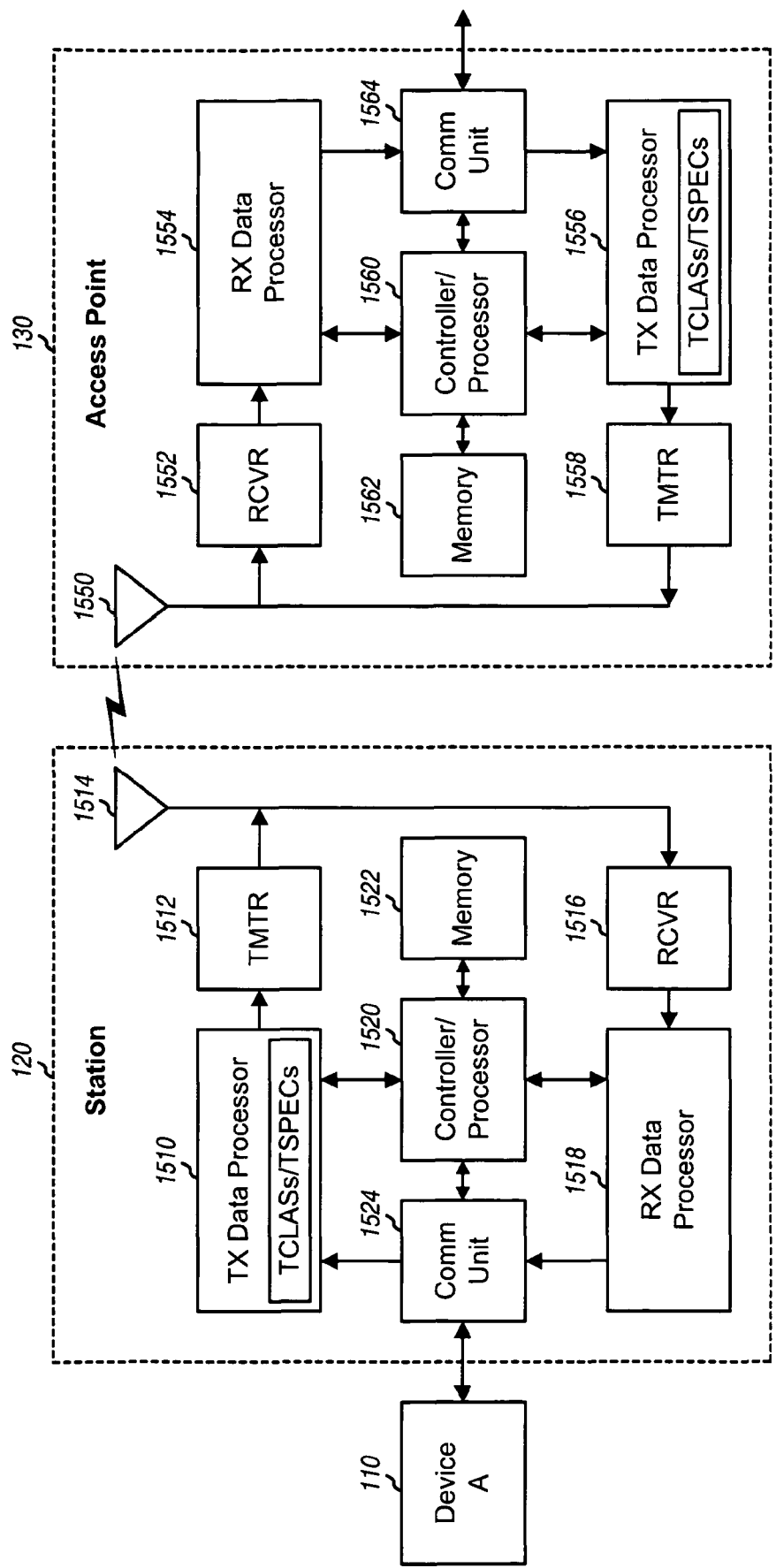
FIG. 15 shows a block diagram of the station and the access point.

FIG. 15 shows a block diagram of an embodiment of station 120 and access point 130. For uplink transmission, a transmit (TX) data processor 1510 classifies uplink packets to be sent by station 120, processes (e.g., encodes and modulates) the packets, and generates output chips. A transmitter (TMTR) 1512 conditions (e.g., converts to analog, filters, amplifies, and upconverts) the output chips and generates an uplink signal, which is transmitted via an antenna 1514. At access point 130, the uplink signal from station 120 is received by an antenna 1550 and conditioned (e.g., filtered, amplified, downconverted, and digitalized) by a receiver (RCVR) 1554 to generate input samples. A receive (RX) data processor 1554 processes (e.g., demodulates and decodes) the input samples and provides decoded data.

For downlink transmission, a TX data processor 1556 classifies downlink packets to be sent by access point 130, processes the packets, and generates output chips. A transmitter 1558 conditions the output chips and generates a downlink signal, which is transmitted via antenna 1550. At station 120, the downlink signal is received by antenna 1514 and processed by a receiver 1516 to obtain input samples. An RX data processor 1518 further processes the input samples and provides decoded data.

TX data processors 1510 and 1556 and RX data processors 1518 and 1554 perform processing in accordance with the wireless technology (e.g., IEEE 802.11a/g/n) used for communication between station 120 and access point 130. TX data processor 1510 may perform traffic classification for uplink packets based on TCLASs defined for uplink and bi-directional traffic streams and may send these packets in accordance with the associated TSPECs. TX data processor 1556 may perform traffic classification for downlink packets based on TCLASs defined for downlink and bi-directional traffic streams and may send these packets in accordance with the associated TSPECs.

Controllers/processors 1520 and 1560 direct the operation at station 120 and access point 130, respectively. At station 120, processor 1510 and/or 1520 may perform process 1000 in FIG. 10, process 1100 in FIG. 11, and/or other process for classification and transmission of uplink packets. At access point 130, processor 1556 and/or 1560 may perform process 900 in FIG. 9, process 1300 in FIG. 13, and/or other process for classification and transmission of downlink packets. Memories 1522 and 1562 store program codes and data for station 120 and access point 130, respectively. A communication (Comm) unit 1524 supports communication between station 120 and device 110. A communication unit 1564 supports communication between access point 130 and hub/router 140 and/or other devices.

The techniques described herein may be implemented by various means. For example, these techniques may be implemented in hardware, firmware, software, or a combination thereof. For a hardware implementation, the processing units used to perform traffic classification may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with instructions (e.g., procedures, functions, and so on) that perform the functions described herein. The firmware and/or software instructions may be stored in a memory (e.g., memory 1522 or 1562 in FIG. 15) and executed by a processor (e.g., processor 1520 or 1560). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
   at least one processor configured to receive packets at a station for transmission on uplink to an access point, the at least one processor configured to:
   negotiate with the access point to accept at least one bi-directional traffic stream from the station to the access point;
   send at least one traffic classification (TCLAS) from the station for the at least one bi-directional traffic stream to the access point in response to the access point accepting the at least one traffic stream, the TCLAS being for classification of downlink packets received at the access point for the at least one bi-directional traffic stream, the at least one TCLAS further configured for classification of uplink packets for the at least one bi-directional traffic stream at the station;

identify uplink packets for each traffic stream of the at least one bi-directional traffic stream based on classification parameters of the at least one TCLAS, the classification parameters comprising a source address and a destination address;

determine whether an uplink packet is associated with the bi-directional traffic stream by making a first comparison of a source address of the packet against the destination address in the TCLAS at the station, making a second comparison of a destination address of the packet against the source address in the TCLAS at the station, and determining that the uplink packet belongs to the bi-directional traffic stream based, at least in part, on results of the first and second comparisons; and send the uplink packets for the at least one bi-directional traffic stream in accordance with at least one quality of service (QoS) parameter for the at least one bi-directional traffic stream; and a memory coupled to the at least one processor.

2. The apparatus of claim 1, wherein the source address of the TCLAS comprises an Ethernet source address, a source Internet Protocol (IP) address, or a source port, and wherein the destination address comprises an Ethernet destination address, a destination IP address, or a destination port.

3. The apparatus of claim 1, wherein the at least one traffic stream further comprises an uplink traffic stream associated with an uplink TCLAS having a source address and a destination address as the at least one classification parameter for the uplink traffic stream.

4. The apparatus of claim 1, wherein the at least one processor is configured to determine whether the at least one traffic stream is defined and to identify the received packets if the at least one traffic stream is defined.

5. The apparatus of claim 1, wherein the at least one processor is configured to determine whether a traffic specification (TSPEC) is defined for any of the at least one traffic stream, and identify the received packets for at least one traffic stream having a TSPEC defined for the at least one traffic stream.

6. The apparatus of claim 1, wherein the at least one processor is configured to wirelessly send the at least one TCLAS for the traffic stream to the access point.

7. A method comprising:

negotiating with an access point to accept at least one traffic stream from a station to the access point;

sending at least one traffic classification (TCLAS) associated with at least one bi-directional traffic stream from the station to the access point for classification of downlink packets received at the access point for the at least one bi-directional traffic stream in response to the access point accepting the at least one bi-directional traffic stream, the at least one TCLAS further configured for classification of uplink packets for the at least one bi-directional traffic stream at the station;

receiving packets at the station for transmission on uplink to the access point;

identifying, at the station, uplink packets in the received packets for each traffic stream of the at least one bi-directional traffic stream based on classification parameters of the at least one TCLAS, the classification parameters comprising a source address and a destination address, the identifying the uplink packets in the received packets comprising making a first comparison of a source address of the received packets against the destination address in the TCLAS at the station, making a second comparison of a destination address of the received packets against the source address in the TCLAS at the station, and determining whether the received packets belong to the bi-directional traffic stream based, at least in part, on results of the first and second comparisons; and sending the uplink packets for the at least one bi-directional traffic stream in accordance with at least one quality of service (QoS) parameter for the at least one bi-directional traffic stream.

8. An apparatus comprising:

means for negotiating with an access point to accept at least one bi-directional traffic stream from a station to the access point;

means for sending a traffic classification (TCLAS) associated with at least one bi-directional traffic stream from the station to an access point in response to the access point accepting the at least one traffic stream, the TCLAS being for classification of downlink packets received at the access point for the at least one bi-directional traffic stream, based at least in part on the access point accepting the at least one bi-directional traffic stream, the TCLAS further configured for classification of uplink packets for the at least one traffic stream at the station;

means for receiving packets at the station for transmission on uplink to the access point;

means for identifying in the received packets uplink packets for each traffic stream of at least one bi-directional traffic stream based classification parameters of the TCLAS; and means for sending the uplink packets for each of the at least one traffic stream in accordance with at least one quality of service (QoS) parameter for the at least one traffic stream, wherein the means for identifying packets further comprises means for making a first comparison of a source address of the received packets against a destination address in the TCLAS at the station, means for making a second comparison of a destination address of the received packets against a source address in the TCLAS at the station, and means for determining whether the received packets belong to the at least one bi-directional traffic stream based, at least in part, on results of the first and second comparisons.

9. A non-transitory computer-readable medium including instructions stored thereon which are executable by a processor to:

negotiate with the access point to accept at least one bi-directional traffic stream from the station to the access point;

send at least one traffic classification (TCLAS) associated with the at least one bi-directional traffic stream from the station to the access point in response to the access point accepting the at least one traffic stream, the TCLAS being for classification of downlink packets received at the access point for the at least one bi-directional traffic stream and for classification of uplink packets received at the station for the at least one bi-directional traffic stream, the sending being based at least in part one the access point accepting the at least one bi-directional traffic stream;

identify uplink packets received at the station for transmission on uplink to the access point for each traffic stream of at least one bi-directional traffic stream based on at least one classification parameter of the at least one TCLAS at the station for the traffic stream, the TCLAS at the station including at least a source address and a destination address as the at least one classification parameter for uplink packets associated with the at least one bi-directional traffic stream, the identifying further comprising making a first comparison of a source address of the received packets against the destination address in the TCLAS at the station, making a second comparison of a destination address of the received packets against the source address in the TCLAS at the station, and determining whether the received packets are uplink packets belonging to a traffic stream of the at least one the bi-directional traffic stream based, at least in part, on results of the first and second comparisons; and initiate sending packets for each of the at least one traffic stream in accordance with at least one quality of service (QoS) parameter for the each of the at least one traffic stream.

10. An apparatus comprising:

at least one processor configured to:

accept a bi-directional traffic stream between a station and the apparatus in response to negotiations initiated by the station;

receive a traffic classification (TCLAS), for classification of downlink packets at the apparatus, from the station requesting the bi-directional traffic stream based at least in part on the apparatus accepting the bi-directional traffic stream from the station, the TCLAS further configured for classification of uplink packets for the traffic stream at the station;

receive packets at the apparatus;

identify downlink packets for the bi-directional traffic stream in the received packets based, at least in part, on classification parameters of the TCLAS, the classification parameters comprising a source address and a destination address, the at least one processor further configured to identify downlink packets in the received packets for the bi-directional traffic stream by, for each received packet, making a first comparison of a source address of the received packet against the destination address in the TCLAS at the apparatus, making a second comparison of a destination address of the received packet against the source address in the TCLAS at the apparatus, and determining whether the received packet belongs to the bi-directional traffic stream based, at least in part, on results of the first and second comparisons, and send the downlink packets for the bi-directional traffic stream in accordance with at least one quality of service (QoS) parameter for the bi-directional traffic stream; and a memory coupled to the at least one processor.

11. A method comprising:

accepting, at an access point, one or more bi-directional traffic streams between a station and the access point in response to negotiations initiated by the station;

receiving, at the access point, one or more traffic classifications (TCLASs), for classification of downlink packets at the access point, from the station requesting the one or more bi-directional traffic streams based at least in part on the access point accepting the one or more bi-directional traffic streams from the station, the one or more TCLASs further configured for classification of uplink packets for the one or more traffic stream at the station;

receiving packets at the access point for transmission on downlink to the at least one station;

identifying downlink packets for the bi-directional traffic stream in the received packets based on the at least one classification parameter for the bi-directional traffic stream by, for each received packet, making a first comparison of a source address of the received packet against the destination address in the TCLAS at the access point, making a second comparison of a destination address of the received packet against the source address in the TCLAS at the access point, and determining whether the received packet belongs to the bi-directional traffic stream based, at least in part, on results of the first and second comparisons; and sending the downlink packets for the bi-directional traffic stream in accordance with at least one quality of service (QoS) parameter for the bi-directional traffic stream.

12. An apparatus comprising:

means for accepting, at an access point, a bi-directional traffic stream between a station and the access point in response to negotiations initiated by the station;

means for receiving a traffic classification (TCLAS), for classification of downlink packets at the access point, from the station requesting the bi-directional traffic stream based at least in part on the access point accepting the bi-directional traffic stream from the station, the TCLAS further configured for classification of uplink packets for the bi-directional traffic stream at the station;

means for receiving packets at the access point for transmission on downlink to at least one station;

means for identifying downlink packets for a bi-directional traffic stream in the received packets based on classification parameters of the TCLAS, the classification parameters comprising a source address and a destination address, the means for identifying further comprising means for making a first comparison of a source address of each of the received packets against the destination address in the TCLAS at the apparatus, means for making a second comparison of a destination address of each of the received packets against the source address in the TCLAS at the apparatus, and means for determining whether each received packet belongs to the bi-directional traffic stream based, at least in part, on results of the first and second comparisons; and means for sending the downlink packets for the bi-directional traffic stream in accordance with at least one quality of service (QoS) parameter for the bi-directional traffic stream.

13. A non-transitory computer-readable medium including instructions stored thereon, comprising:

first instructions for accepting, at an access point, a bi-directional traffic stream between a station and the access point in response to negotiations initiated by the station;

second instructions for receiving, at the access point, one or more traffic classifications (TCLASs), for classification of downlink packets at the access point, from the station requesting the one or more bi-directional traffic streams, the one or more TCLASs further configured for classification of uplink packets for the one or more traffic stream at the station;

third instructions for receiving packets at the access point for transmission on downlink to at least one station;

fourth instructions for identifying downlink packets for a bi-directional traffic stream in the received packets based on the at least one classification parameter for the bi-directional traffic stream by, for each received packet, making a first comparison of a source address of the received packet against the destination address in the TCLAS at the access point, making a second comparison of a destination address of the received packet against the source address in the TCLAS at the access point, and determining whether the received packet belongs to the bi-directional traffic stream based, at least in part, on results of the first and second comparisons; and fifth instructions for sending the downlink packets for the bi-directional traffic stream in accordance with at least one quality of service (QoS) parameter for the bi-directional traffic stream.

\* \* \* \* \*